(12) United States Patent
Jackson et al.

(10) Patent No.: US 6,322,841 B1
(45) Date of Patent: Nov. 27, 2001

(54) CHEESE-LIKE DAIRY GELS

(75) Inventors: Linda K. Jackson, Lake Forest; Richard H. Lincourt, Mundelein; Daniel G. Lis, Wheeling, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/500,612

(22) Filed: Feb. 9, 2000

(51) Int. Cl.[7] ................................................ A23C 20/00
(52) U.S. Cl. ...................... 426/582; 426/573; 426/578
(58) Field of Search ............................. 426/582, 36, 573, 426/575, 576, 577, 578

(56) References Cited

U.S. PATENT DOCUMENTS

| | | | | |
|---|---|---|---|---|
| 3,891,777 | * | 6/1975 | Boyer | 99/17 |
| 3,891,778 | * | 6/1975 | Boyer | 99/17 |
| 3,978,243 | | 8/1976 | Pedersen | 426/573 |
| 4,479,973 | | 10/1984 | Holley | 426/573 |
| 4,517,216 | | 5/1985 | Shim | 426/573 |
| 4,568,555 | * | 2/1986 | Spanier | 426/582 |
| 4,647,470 | | 3/1987 | Sanderson et al. | 426/573 |
| 4,869,916 | | 9/1989 | Clark et al. | 426/573 |
| 5,079,024 | | 1/1992 | Crane | 426/573 |
| 5,108,773 | * | 4/1992 | Smith | 426/582 |
| 5,304,387 | * | 4/1994 | Hine | 426/582 |
| 5,338,560 | | 8/1994 | Wesdorp et al. | 426/573 |
| 5,374,443 | | 12/1994 | Jackson et al. | 426/582 |
| 5,486,375 | * | 1/1996 | Yoder | 426/582 |
| 5,532,018 | * | 7/1996 | Miller | 426/582 |
| 5,589,215 | * | 12/1996 | Tang | 426/549 |
| 5,709,900 | * | 1/1998 | Miller | 426/582 |
| 5,807,601 | * | 9/1998 | Carpenter | 426/578 |
| 5,952,030 | * | 9/1999 | Nelles | 426/582 |

FOREIGN PATENT DOCUMENTS

| | | | |
|---|---|---|---|
| 0664085-A1 | * | 7/1995 | (EP) . |
| 58-111649 | | 7/1983 | (JP) . |

* cited by examiner

*Primary Examiner*—Carolyn Paden
(74) *Attorney, Agent, or Firm*—Fitch, Even, Tabin & Flannery

(57) ABSTRACT

The present invention relates to a cheese-like dairy gel that includes a gum, a starch, and a dairy liquid, wherein the gel has the texture, consistency, and mouthfeel of a cheese. In particular embodiments of the dairy gel, it is essentially fat-free, and is chosen from among cottage cheese, ricotta, cream cheese, American cheese, processed cheese, Parmesan cheese, baker's cheese, cheddar, and Feta cheese. The gum may be an ionically neutral gum, such as konjac, or a microbial gum, gellan gum, or it may be an anionic gum, such as a carrageenan, Kappa-carrageenan, furcelleran, agar, alginate, and the like, or mixtures thereof. The starch, in certain embodiments of the invention, may be potato starch, tapioca starch, corn starch, rice starch, wheat starch, and the like, or mixtures thereof. The invention additionally provides a process for preparing a cheese-like dairy gel wherein the ingredients are blended, briefly heated, packaged, and cooled, or it may be cooled and extruded, sliced, diced, or shredded, then packaged. The invention avoids rennetting, fermenting, or acidification that yields curds and whey liquid. It thus provides a simplified process and product which utilizes all the ingredients of the dairy liquid employed.

35 Claims, 1 Drawing Sheet

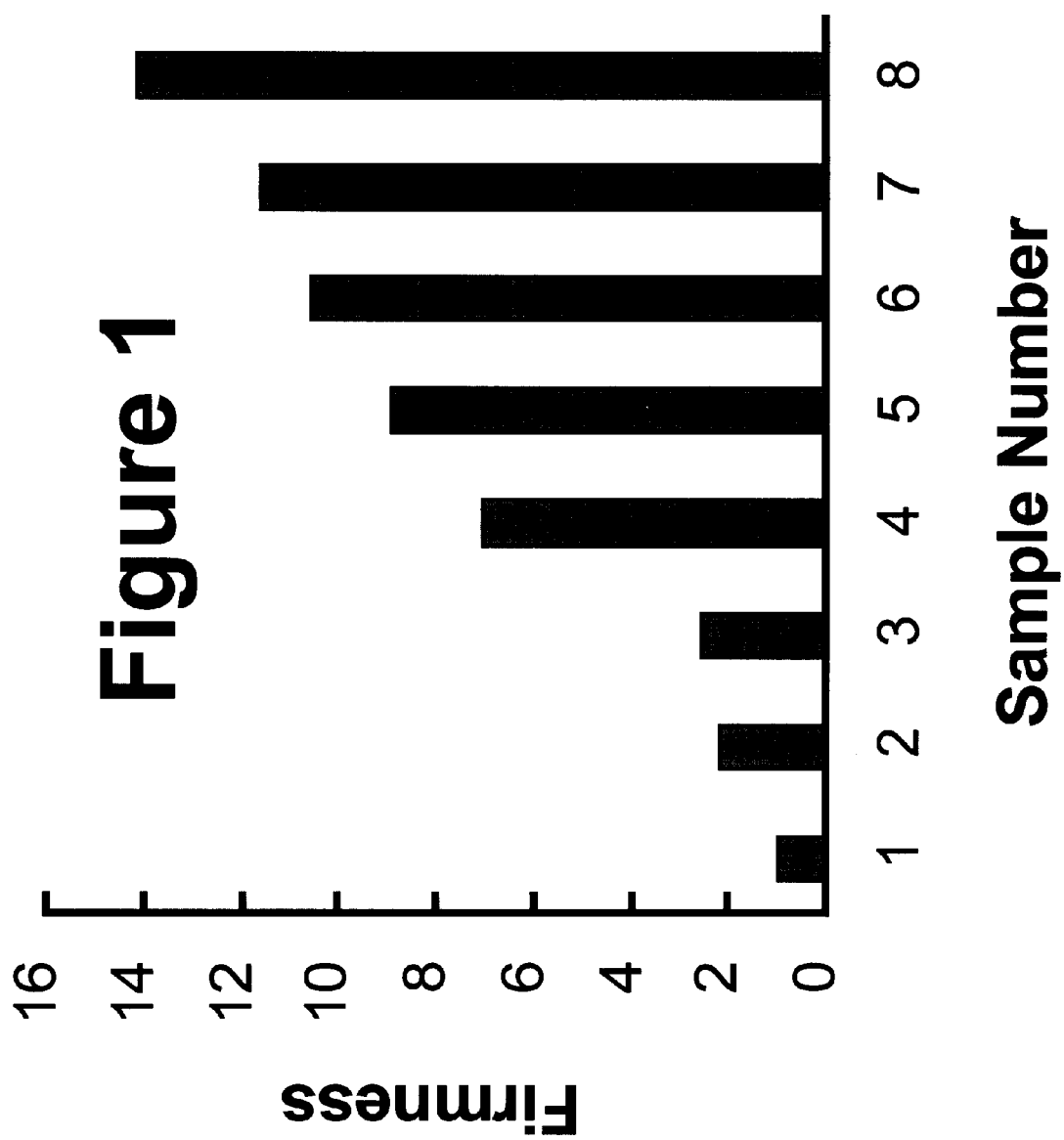

CHEESE-LIKE DAIRY GELS

FIELD OF THE INVENTION

The present invention relates to cheese-like dairy gels containing gums, starches, and dairy liquids. These dairy gels have the texture, consistency, and mouthfeel of a cheese. The gels are prepared by a process that does not entail renneting or coagulating a dairy liquid. Rather the gels are characterized by the inclusion of specific components that provide the texture and consistency of a cheese.

BACKGROUND OF THE INVENTION

Cheese compositions are generally prepared from dairy liquids by processes that include treating the liquid with a coagulating or clotting agent. The coagulating agent may be a curding enzyme, an acid, a suitable bacterial culture, or it may include such a culture. The coagulum or curd that results generally incorporates transformed casein, fats including natural butter fat, and flavorings that arise (especially when a bacterial culture is used). The curd is then separated from the liquid whey. The resulting whey generally contains soluble proteins not affected by the coagulation; such proteins are, of course, not incorporated into the coagulum. The inability of whey proteins to be retained in the coagulum is an important factor contributing to a lack of efficiency in production of cheese curds, and to a reduction in overall yield relating to the incorporation of all the protein solids that are present in the starting dairy liquids into resulting cheese curds. These problems have been recognized for many years.

Cottage cheese and other firm-bodied cheeses are conventionally prepared by fermenting and/or acidifying milk to form precipitated milk protein curds, and a relatively large amount of liquid whey which is separated from the curd. While subsequent processing may be utilized to recover useful components such as whey protein from the byproduct whey, the whey produced in conventional cheesemaking nevertheless represents a significant environmental disposal issue. Economical solidified milk products, in which all of the fluid milk is utilized to produce a wholesome firm-bodied, relatively low calorie food product having cheese-like texture would be desirable from an environmental perspective.

U.S. Pat. Nos. 4,647,470, 4,517,216 and 4,869,916 are directed to gellan gums, especially partially or completely deacylated gellan gums, and blends of gellan gums with starch, xanthan, konjac and gelatin for thickening and gelling a variety of food products. These patents do not provide firm-bodied gelled milk products having the texture of cheese.

Milk can be conventionally gelled to provide gelled milk desserts, such as puddings, having a soft texture. For example, U.S. Pat. No. 4,479,973 describes gelled milk desserts comprising milk, modified starch, iota-carrageenan, and xanthan with locust bean gum, guar gum, or gelatin. However, such gelled milk compositions have a relatively soft gel texture intended for a dessert composition. They fail to provide the firm, chewy texture of a cheese.

Sour milk containing a stabilizer (i.e., high methoxyl pectin, carboxymethylcellulose or propylene glycol alginate) has been gelled with electronegatively charged gelling agents such as low methoxyl pectin, carrageenan, and furcelleran (U.S. Pat. No. 3,978,243). Under these conditions, the casein in the acidified milk does not coprecipitate with the stabilizer and/or gelling agent additives. This process does not provide a cheese-like dairy gel such as a cheese curd product.

A non-fat cream cheese type product having the appearance, taste and consistency of fat-containing cream cheese is provided in U.S. Pat. No. 5,079,024. Concentrated skim milk is heated together with an emulsifier salt. The resulting mixture is transferred to a second agitating mixer, then combined with a gum to provide a thickened skim milk. After homogenization, the resulting mixture is transferred to a third agitating mixer, and a suitable bulking agent and an additional gum are added while heating with agitation. The mixture is then homogenized again to provide the cream cheese product. The manufacture of this cream cheese product requires both an emulsifier salt and a bulking agent, as well as a complex process, including multiple heating, agitation, and homogenization steps.

Edible plastic dispersions based on rapid gel setting starches are disclosed in U.S. Pat. No. 5,338,560. These dispersions require a gelling composition containing a gelling agent in an amount of 1 to 8 times the critical concentration, and a continuous gel-forming composition containing a gelling starch in an amount of 1 to 8 times the critical concentration. Additionally the compositions may also contain dairy and non-dairy ingredients as a source of fat, flavoring, and/or protein. The compositions are useful as, for example, bread spreads to replace margarine or halvarine.

A low-fat processed cheese prepared from skim milk cheese, a low viscosity bulking agent (i.e., levuloglucosan), and an emulsifying salt is provided in U.S. Pat. No. 5,374,443. The mixture is briefly heated to provide a homogenous molten cheese mass, then packaged, to provide a low fat processed cheese.

Japanese Patent 58 111649 (English Abstract) discloses adding kappa-carrageenan to an aqueous material (i.e., cocoa, coffee, milk, fermented milk, cheese, or fruit juice) and at least one cation selected from potassium, calcium, magnesium, and ammonium cations. This mixture can be gelled at normal temperature to form a stable aqueous gel.

There remains a need in the dairy industry for a cheese-like composition that utilizes and incorporates all the protein components present in dairy liquids such as milk and milk-derived components. In particular, conventional cheese manufacturing processes provide a cheese curd and a separate whey component. The whey component is not normally used or incorporated in cheese products formed from the curd. Thus, there remains a need for providing a cheese-like product that incorporates the nutritional components normally lost with the whey component. There furthermore remains a need for providing a cheese-like product starting from a dairy liquid such as milk or milk-derived components, that can be gelled to form a product having the texture, consistency, and mouthfeel of a cheese. There also remains a need for a process for making a gelled, cheese-like product from liquid milk products without the need to form curds and whey. There is also a need for a simplified process for making a gelled, cheese-like product from liquid milk products which uses essentially all the components (e.g., protein) in the liquid milk product. Such a simplified process would offer the advantages of minimizing capital requirements and providing an economical manufacturing process. The present invention provides cheese-like compositions and processes that fulfills the needs identified herein.

SUMMARY OF THE INVENTION

The present invention provides a cheese-like dairy gel that includes a gum, a starch, and a dairy liquid, wherein the gel has the texture, consistency, and mouthfeel of a cheese. In particular embodiments of the dairy gel, it is essentially fat-free and may be chosen from among any of a wide variety of cheeses, including, by way of nonlimiting example, cottage cheese, ricotta, cream cheese, American cheese, processed cheese/cheese food/cheese product, Parmesan cheese, baker's cheese, cheddar, Feta cheese, and other natural cheeses. The dairy gels of this invention can be formed into a variety of shapes including, but not limited to, curds, chunks, shreds, slices, blocks, fantasy (e.g., stars, letters, animals, and the like that would appeal to children), and the like.

The cheese-like dairy products of this invention contain gums, starches, and dairy liquids. Suitable gums include, for example, gellan gum, carrageenan and kappa-carrageenan, konjac, agar, furcelleran, alginate, and the like. Mixtures of such gums may also be used. Suitable liquid dairy product includes whole milk, low fat milk, fat-free milk, milk concentrate, reconstituted powdered milk, cream, fortified milk, and mixtures thereof. Suitable starches include potato starch (including acid-thinned potato starch), tapioca starch, dent or high amylose corn starch, rice starch, wheat starch, and mixtures thereof. Preferably the starch is acid-thinned potato starch, tapioca starch, or mixtures thereof.

Generally, the cheese-like dairy gels of the present invention include about 0.2 to about 2.0 percent of a gum, about 0.5 to about 12 percent of a starch, and about 75 to about 99 percent of dairy liquid. Preferably, the cheese-like dairy gels include about 0.4 to about 1.5 percent gum, about 4 to about 12 percent starch, and about 80 to about 95 percent dairy liquid. More preferably, the cheese-like dairy gel consists essentially of about 0.6 to about 1.0 percent of a deacylated gellan, about 8 to about 10 percent of an acid thinned potato starch, and a dairy liquid having about 8.5 percent milk solids, wherein the milk solids are obtained from a non-fat milk, a low fat milk, or whole milk, and wherein the resulting dairy gel has the texture, consistency, and mouthfeel of a cheese. This gel may optionally contain additives such as, for example, titanium dioxide, calcium cations, sequestrants, flavorings, proteins, fibers, nutritive and non-nutritive sweeteners, vitamins, minerals, beneficial bacteria, preservatives, stabilizers, colorants, and mixtures thereof. These optional additives are such that they do not adversely affect the desirable organoleptic properties of the dairy gel.

In a further aspect of the present invention, a process for preparing a cheese-like dairy gel is provided that includes the steps of (i) combining a gum and a starch to form a dry mixture;
(ii) adding the dry mixture to a dairy liquid to form a liquid dairy slurry;
(iii) heating the liquid dairy slurry to about 160 to about 225° F. for about ¼ minute to about 3 minutes to form a gelable liquid suspension;
(iv) optionally homogenizing the gelable liquid suspension; and
(v) cooling the liquid suspension from step (iii) or step (iv) to ambient temperature or below, thereby forming the cheese-like dairy gel. Preferably, the liquid dairy slurry is homogenized prior to the heating step. Preferably the cooling step is carried out in at least two stages. In the first stage, the heated liquid is cooled to a temperature at which the liquid suspension remains flowable and/or pumpable (i.e., a fluid). In this state, the liquid can be easily dispersed into suitable containers. In this first stage, the temperature preferably remains above about 140° F. The second stage, preferably after the liquid has been dispersed into suitable containers, involves further cooling to ambient temperatures or below (e.g., to refrigeration temperatures). The resulting cheese-like dairy gel has similar texture, consistency, and mouthfeel of a conventional cheese. By adding the appropriate flavorants and/or colorants, the taste and appearance of various types of conventional cheese can be obtained. Alternatively, the heated liquid suspension may be dispensed into molds and cooled, providing novel shapes. It can be cooled in bulk until gelled, then sliced, shredded, or extruded through dies into various shapes. It can be dispensed into packages of specific size and shape, such as cheese slices, chunks, or bricks.

Preferably in step (i) of the above-described process, the dry mixture has a weight ratio of gum to starch of about 4:1 to about 1:60. Preferably, the cheese-like dairy gel produced has about 0.6 to about 2.0 percent gum and about 6 to about 15 percent starch. More preferably, the cheese-like dairy gel has about 0.8 to about 1.5 percent gum and about 8 to about 12 percent starch. Preferably the dairy liquid in step (ii) contains about 6.0 to about 20.0 percent milk solids, more preferably about 8.0 to about 9.0 percent milk solids. Preferably the milk solids are derived from non-fat, low-fat, whole, or fortified milk. It is particularly preferred that the gum is a deacylated gellan at a level of about 0.6 to about 1.0 percent (based on the total weight of the dairy gel) and that the starch is an acid thinned potato starch at a level of about 8 to 10 percent (based on the total weight of the dairy gel). Preferably the dairy liquid contains about 8.0 to about 9.0 percent of milk solids derived from milk (no-fat, low-fat, whole, or fortified), and more preferably about 8.5 percent of such milk solids.

In significant embodiments of the process, the liquid composition employed in step (ii) further includes a divalent cation chosen from among calcium, magnesium, and mixtures thereof, and a sequestrant which may be chosen from among disodium phosphate, trisodium phosphate, tetrasodium pyrophosphate, tricalcium citrate, or other food grade sequestrants. In still additional advantageous embodiments, the process further provides additives chosen from among titanium dioxide, flavoring, protein, fiber, sweeteners, vitamins, minerals and mixtures thereof. These additives can be included in either the dry mixture employed in step (i) or the dairy liquid employed in step (ii), or in both the dry mixture and the dairy liquid. In yet an additional embodiment, the process includes adding beneficial bacteria to the fluid dairy gel of step (v) at a temperature at which the bacteria remain viable, and blending the bacteria into the fluid gel.

DESCRIPTION OF THE DRAWING

FIG. 1 illustrates the firmness of milk gels produced by the present invention (Samples 7 and 8) as compared to that of a commercial cottage cheese (Sample 6) and non-inventive gels (Samples 1–5). Details are provided in Example 1.

DETAILED DESCRIPTION OF THE INVENTION

The present invention provides a cheese-like dairy gel that includes a gum, a starch, and a dairy liquid, and that has the texture, consistency, and mouthfeel of a cheese. The dairy gel utilizes and incorporates all the protein components present in the dairy liquids that are employed in its preparation, rather than losing the protein and other components present in whey when the latter separates from the cheese curd as occurs in conventional cheese making procedures. The present invention further provides a cheese-like product starting from a dairy liquid such as milk, or milk-derived components, that can be gelled to a product having the texture, consistency, and mouthfeel of a cheese by means of a simple manufacturing process that minimizes the number of unit operations involved in providing the product. Such a simplified process is highly advantageous, for it offers the benefits of minimizing capital equipment and facilities requirements while providing an economical manufacturing process.

The present invention provides a previously uncontemplated cheese-like dairy gel that has the texture, consistency, and mouthfeel of a cheese. This dairy gel comprises a gum, a starch, and a dairy liquid. When the dairy liquid used in preparing the composition is fat-free, such as fat-free milk, the resulting dairy gel is likewise essentially fat-free. Many cheese-like dairy gels may be prepared according to the present invention. Particular flavorings and/or cultures characteristic of a particular variety of cheese may be added to provide a dairy gel having desirable flavors. Using particular flavorings and/or characteristic cultures, dairy gels can be prepared which have similar flavor and other characteristics normally associated with, for example, cottage cheese, ricotta, cream cheese, American cheese, processed cheese, Parmesan cheese, baker's cheese, cheddar, Feta cheese, cheese, and other natural cheeses.

The present invention provides that components added to the dairy liquid, in the fashion described, yield the cheese-like dairy gel. An important component included in the dairy gel is a gum. In general, suitable gums include polysaccharides and derivatized polysaccharides that are obtainable from different sources. Such sources include, by way of nonlimiting example, trees, shrubs, fruits of various trees and shrubs, marine plants such as various seaweeds, and microbes. Included among the variety of gums known in the dairy food arts are gums that are electrically neutral (i.e., they bear no ionically charged groups), those that are polycationic, and those that are polyanionic. Anionic gums include those such as, by way of nonlimiting example, gellan, carrageenans, agar, furcelleran, and alginate. Preferred gums include polyanionic gums and neutral gums. In a particularly preferred embodiment, the gum is a carrageenan, kappa-carrageenan, or deacylated gellan, or mixtures thereof. Kappa-carrageenan is one of the three principal forms of carrageenan. It is believed to be a hydrocolloid mainly consisting of a copolymer of alternating D-galactose-4-sulfate ester and 3,6 anhydro-D-galactose units, which may exist as a salt with potassium, sodium, magnesium or calcium ions. A small percentage of the 3,6 anhydro-D-galactose units are sulfated in the 2 position. In certain products, some lambda and/or iota carrageenan may be utilized in addition to the kappa-carrageenan. Kappa-carrageenan is available preferably as GP911, GP912, and less preferably for the purposes of this invention as GP713, all from FMC Corporation Food Ingredients Division, Philadelphia, Pa.; or other products from Hercules, Inc., Food Gums Division, Wilmington, Del., Shemburg USA, Searsport, Me.; and Quest International, North American Business and Technology Center, Hoffman Estates, Ill.

Gellan gums are extracellular polysaccharides obtained by the aerobic fermentation of the microorganism, *Pseudomonas elodea*, in a suitable nutrient medium. Various forms of gellan gum have been described in U.S. Pat. Nos. 4,326,053 and 4,503,084, which are incorporated herein by reference. For example, native, deacylated, deacylated clarified, partially deacylated, and partially deacylated clarified gellan forms have been prepared. For use in this invention, the gellan gum could be native or deacylated but should preferably be of the low acyl (LA) type (i.e., acyl levels below about 0.5 percent and preferably below about 0.3 percent). Gellan gum is available, for example in a deacylated form, as Kelcogel, Kelcogel F, Kelcogel BF, or Kelcogel BF-10 (blends of gellan with citrate and/or sugar), Kelcogel JJ, Kelcogel IF, Kelcogel CF, or Kelcogel CF-10, and in native form as Kelcogel LT100, all from Monsanto Co., NutraSweet Kelco, Chicago, Ill. The concentration of the gum included in the dairy gel is about 0.2 to about 2.0 percent. More preferably, the concentration of the gum is about 0.4 to about 1.0 percent.

The dairy gel of the present invention includes a starch. Preferably, the starch is chosen from among potato starch, tapioca starch, corn starch, rice starch, wheat starch, and mixtures thereof. In a more preferred embodiment, the starch is chosen from the group consisting of potato starch, tapioca starch, and mixtures thereof. Starches that provide a waxy mouthfeel, such as amylopectin and similar starches, are not suitable for use in the present invention. The starch component employed in the dairy gel may be dextrinized, oxidized, enzymatically degraded (thereby providing higher DE (dextrose equivalent) values), or physically modified starches such as those provided by Opta Food Ingredients, Bedford, Mass., including preferably OptaGrade 301, as well as OptaMist, CrystaLean, OptaFil, Optex, and Optamax; Stellar and Instant Stellar (A. E. Staley Manufacturing Co., Decatur, Ill.); and Novelose and N-Oil (National Starch and Chemical Co., Bridgewater, N.J. It is preferred to employ acid thinned or oxidized starch. Although the starch may be unmodified, it is preferred that modified starches be employed. These products include Perfectamyl Gel MB, or alternatively, Perfectamyl Gel MB special, Perfectamyl HM1499, or Perfectamyl HO 12905B, and less preferably, Perfectamyl Gel, Perfectamyl Gel NF, Perfectamyl Gel 30, Perfectamyl Gel 45, Perfectamyl B1102, all provided by Avebe b.a. International Marketing and Sales, Foxhol, Netherlands. The starches may be either native or chemically substituted or modified. For use in the present invention, the starch should be reduced in molecular weight by treatments such as acid thinning, dextrinization, physical or enzymatic degradation or oxidation to a fluidity of 30 percent to 80 percent and/or a DE of 0 to 5.

Generally, the fluidity of the starch employed should be between about 30 percent and about 90 percent; preferably the fluidity is between about 40 percent and about 60 percent. Fluidity measures the degree of thinning (i.e., smaller chain lengths) of a starch preparation as the result of acid or oxidation treatments. Examples of such preferred starches include the acid-thinned or oxidized potato starches Perfectamyl™ Gel MB, Perfectamyl™ Gel MB special, Perfectamyl™ Gel HM 1499, Perfectamyl™ Gel HO 12905B, and Perfectamyl™ Gel NF (Avebe, Netherlands). The DE value of the starch should be between zero and about 5 . For starches with DE values of zero, the resulting dairy gel generally has a pasty texture and off-flavors and is difficult to process. For a DE value greater than 5, the dairy gel is generally non-functional (i.e., too soft). Generally, the concentration of the starch is about 0.5 to about 15 percent, and more preferably about 4 to about 11 percent. Acid-thinned or oxidized starches are generally preferred since they can be incorporated into the dairy gel compositions at higher levels to provide the desired firmness and texture of the gels. The addition of tapioca starch, in an amount of about 2 to about 6 percent, and preferably about 4 percent, or tapioca dextrin (e.g., N-Oil™ from National Starch and Chemical), in an amount of about 3 to about 6 percent, and preferably about 5 percent, or physically degraded high amylose starch (e.g., Opta Grade 301) in an amount of about 3 to about 6 percent, and preferably about 5 percent, confers a more sticky, chewy, or adherent texture and mouthfeel to the resulting dairy gel.

As used herein, "dairy liquid" relates to milk, fortified milk products, milk products obtained by fractionating raw milk to provide a liquid fraction, and a solid milk fraction that is reconstituted to a liquid. For example, milk may be treated to remove some or all of the butterfat, providing low fat milk or fat-free (i.e., skim) milk, respectively. On the other hand, in certain dairy gels, the dairy liquid may be supplemented with cream. Furthermore, whole milk, low fat milk, or skim milk may be concentrated by methods such as evaporation and/or ultrafiltration (with or without diafiltration) and the like. Evaporation provides dairy liquids containing a higher concentration of all the nonvolatile components, whereas ultrafiltration provides dairy liquids with a higher concentration of the components that are nonpermeable to the ultrafiltration membrane. In any case, dairy proteins including casein and whey protein are included among the retained solids, such that their concentrations in the resulting liquids are increased. Furthermore any of the above dairy liquids may be evaporated to dryness, providing milk solids originating from fortified milk, whole milk, low fat milk, or skim milk. Any of these solids may be reconstituted by the addition of water or a suitable aqueous composition including milk or a milk fraction. Reconstitution of dry milks thus provides dairy liquids that in general may have a broad range of final concentrations of the component proteins, butterfat, and other components. All the above liquids are included in the designation of "dairy liquids" as used herein.

The dairy liquids employed in the present invention may originate from any lactating livestock animal whose milk is useful as a source of human food. Such livestock animals include, by way of nonlimiting example, cows, buffalo, other ruminants, goats, sheep, and the like. Generally, however, cows' milk is the preferred dairy liquid used in the practice of the invention.

The present invention does not require the use of rennet, fermenting, acidification, or other clotting or coagulating agents or techniques. Rennet is a generic term used in the field of dairy science and in the field of cheese making, to designate an activity obtained from the lining of the stomachs of immature mammals that consume maternal milk. The natural function of rennet is to initiate the digestion of the milk in order to provide the nutrition contained in the milk protein to the young mammal. In cheese making, rennet is used to clot the dairy liquids, thereby forming cheese curd and whey. The term "renneting" relates to the process of treating a dairy liquid with a rennet to provide a cheese curd and whey. Synonyms for "renneting" include "curding", "clotting", and "setting". As used in contemporary dairy science, "rennet" connotes the enzyme earlier called "rennin" and now termed "chymosin". Dairy liquids may also be clotted or set by the addition of an acid to the dairy liquid. The acid may be an inorganic acid or an organic acid. Furthermore, dairy liquids may be clotted by culturing them with a bacterial culture known in the dairy arts to produce a cheese curd and whey. An important aspect of the present dairy gel and the present method of preparing the dairy gel is that curding, clotting, or setting, whether by a rennet, an acid, or a culture, or any combination of these methods, is avoided. By virtue of omitting this step, a significant requirement of equipment and manufacturing time is eliminated.

In addition to the gum, starch, and dairy liquid, the composition of this invention may, and in many cases preferably does, contain other additives. For example, the dairy gel of the present invention may further include a divalent cation chosen from the group consisting of calcium, magnesium, and mixtures thereof, and a sequestrant which may be chosen from among disodium phosphate, trisodium phosphate, tetrasodium pyrophosphate, tricalcium citrate, or other food grade sequestrants. The cation may be introduced in various forms (e.g., calcium or magnesium salts or calcium- or magnesium-fortified milk products). The divalent cation, if included, contributes to the favorable texture, consistency, and mouthfeel of the cheese-like dairy gel. Such divalent cations generally improve the gelling characteristics of the composition.

The cheese-like dairy gel of the instant invention may further contain various additives which generally are included at relatively low proportions (generally less than about 2.0 percent) with respect to the total weight of the complete gel composition. Such additives include, for example, titanium dioxide, flavorings, proteins, fibers, sweeteners, vitamins, minerals, beneficial bacteria, preservatives, stabilizers, colorants, and the like. Flavorings may be added to provide the desired cheese taste and aroma (i.e., specific cheese varieties). Such flavorings may include, by way of nonlimiting example, enzyme modified cheese, cheese flavor, fruit and other dessert-type flavors, chocolate, and diacetyl or other butter-type flavors. Various proteins may be added which contribute to the favorable taste and consistency characteristics of the resulting dairy gel as well as increasing the nutritional value of the dairy gel. Proteins that may be incorporated include, by way of nonlimiting example, casein and caseinates, whey proteins, soy protein, cheese, milk protein concentrate, and egg proteins. Food fibers may be added, for example, to modify or enhance the organoleptic properties of the dairy gel. These food fibers include, by way of nonlimiting example, cellulose, methylcellulose, oat glucan, inulin, and psyllium. Sweeteners (both caloric and/or noncaloric) include, but are not limited to, nutritive sweeteners (e.g., glucose, fructose, sucrose, corn syrup, corn syrup solids, high fructose corn syrup, lactose, xylose, maltitol, glucitol, and comparable sweet saccharides, and sugar alcohols), as well as nonnutritive sweeteners such as aspartame, saccharin, and acesulfame K. Still other components that may be added include vitamins, such as, by way of nonlimiting example, vitamin A, B complex vitamins, vitamin D, vitamin E, and the like and minerals such as, by way of nonlimiting example, calcium, iron, and the like. Still further, provision of any of various beneficial bacteria may provide a favorable dairy gel products having a particular cheese-like texture, consistency, and mouthfeel. Examples of such bacteria or cultures include, by way of nonlimiting example, lactobacilli, and bifidobacteria.

The dairy gels of the present invention can be shaped into various physical forms. For example, the heated liquid suspensions prepared by this invention may be dispensed into molds and cooled, providing novel shapes. They can be cooled in bulk until gelled, then sliced, shredded, or extruded through dies into various shapes. Dairy gel shapes that are intended to appeal to children could include, for example, stars, letters, animals, or other appealing shapes. Moreover, they could be of various colors. For adults, the dairy gels of this invention could be formed into conventional cheese shapes (i.e., circular or rectangular blocks, wedges, cheese slices, chunks, shreds, bricks, and the like) or into unconventional shapes.

In a particularly favorable embodiment, the cheese-like dairy gel of the invention consists essentially of about 0.6 to about 1.0 percent of a deacylated gellan, about 8 to about 10 percent of an acid thinned potato starch (e.g., Perfectamyl Gel MB), and a dairy liquid having about 8.5 percent milk solids, wherein the milk solids are obtained from a non-fat milk, a low fat milk, or whole milk, and about 0.25 to about 0.5 percent titanium dioxide. The resulting dairy gel has the texture, consistency, and mouthfeel of a cheese.

The cheese-like dairy gel of the invention may be prepared by a process comprising the steps of (i) combining the gum and the starch to form a dry mixture;

(ii) adding the dry mixture to a dairy liquid to form a liquid dairy slurry;

(iii) heating the liquid dairy slurry to about 160 to about 225° F. for about ¼ minute to about 3 minutes to form a gelable liquid suspension;

(iv) optionally homogenizing the gelable liquid suspension (v) cooling the heated liquid suspension from (iii) or (iv) to a temperature above about 140° F., wherein the temperature is sufficient to permit the liquid suspension to be transported as a fluid;

(vi) dispensing the fluid into a container; and (vii) allowing the fluid to cool to a temperature less than about 115° F.;

whereby the resulting dairy gel has the texture, consistency, and mouthfeel of a cheese. Preferably the liquid dairy liquid is homogenized prior to the heating step. Various cheeses may be prepared by the process of the invention, including, by way of nonlimiting example, cottage cheese, ricotta, cream cheese, American cheese, processed cheese, Parmesan cheese, baker's cheese, cheddar, Feta cheese, and the like.

In particular embodiments of the process of the invention, the dairy liquid employed in step (ii) further comprises a divalent cation chosen from the group consisting of calcium, magnesium, and mixtures thereof, and a sequestrant which may be chosen from among disodium phosphate, trisodium phosphate, tetrasodium pyrophosphate, tricalcium citrate, or other food grade sequestrants. The divalent cation, if included, contributes to the favorable texture, consistency, and mouthfeel of the cheese-like dairy gel. In further embodiments of the process, any of the additives chosen from the group consisting of titanium dioxide, flavorings, proteins, fiber, sweeteners, vitamins, minerals, and mixtures thereof may be included in either the dry mixture employed in step (i), the dairy liquid employed in step (ii), or in both the dry mixture and the liquid composition. Additionally, in an advantageous embodiment the process of the invention further comprises adding beneficial bacteria to the fluid dairy gel of step (v) at a temperature at which the bacteria remain viable, and blending the bacteria into the fluid gel. Such bacteria may be used to produce the taste and flavor of a particular variety of cheese, or to confer other benefits to the consumer.

EXAMPLES

The following examples are provided to illustrate this invention and not to limit it. Unless indicated otherwise, all percentages and ratios throughout this specification are by weight.

Example 1

Firmness of Various Dairy Gels

Dairy gels of the invention were prepared using various concentrations of Kappa-carrageenan, preferably GP 911 or GP912 (FMC Corp.) and/or gellan (Kelcogel, Monsanto Co.). Modified potato starch (Avebe) was included in certain preparations. The dairy liquid was non-fat milk having 8.5 percent milk solids content by weight. The kappa-carrageenan, gellan and potato starch were blended and added to the milk under high shear using a Tekmar Tissuemizer (Tekmar-Dohrmann, Cincinnati, Ohio.). The resulting liquid was heated to 180° F. for 1 min in an open vessel. It was then immediately dispensed into a receiving vessel (e.g., a tray). The liquid was then permitted to cool to a temperature of about 115° F. to gel and further chilled to below about 45°0 F. for purposes of preservation. After storage overnight at refrigerated temperatures, the gel was cut into about ¼ inch cubes. The firmness of the resulting dairy gel cubes was determined by an Instron model 1122 fitted with an Ottawa cell or equivalent (Instron Corp., Canton Mass.). Firmness was determined as the force required to extrude the sample though the cell.

The results obtained with various compositions are shown in FIG. 1, which is a bar graph representation of the firmness obtained for eight samples, discussed here in the order from left to right. The dairy gels in the samples were made as follows:

Sample 1:0.8 percent GFS (a blend of xanthan, carob bean gum, and guar gum, NutraSweet Kelco, a division of Monsanto Corp.), Sample 2:0.4 percent kappa-carrageenan and 4 percent modified potato starch, Sample 3:0.4 percent kappa-carrageenan, Sample 4:0.8 percent kappa-carrageenan, Sample 5:0.8 percent gellan, Sample 6: Breakstone's™ lowfat cottage cheese, Sample 7:0.8 percent kappa-carrageenan and 8 percent modified potato starch; and Sample 8:0.8 percent gellan and 8 percent modified potato starch. Samples 1–6 are comparative examples. Sample 6 is a commercially available cottage cheese. Samples 7 and 8 illustrate dairy gels of the present invention. These results indicated that both the gum and the starch are required at relatively high levels to produce suitable gels. The dairy gels produced in Samples 7 and 8 are even firmer than that of a commercial cottage cheese.

Example 2

Comparison of Various Starches

Dairy gels of the invention were prepared using 0.8 percent gellan (Kelcogel™, Monsanto Corp.). Various starches supplied by Avebe, Opta Food Ingredients, Inc., A. E. Staley Manufacturing Co., National Starch and Chemical Co., Cerestar USA, Inc., Hammond, Ind., and Grain Processing Corp., Muscatine, Iowa., were included at concentrations of 1 percent to 10 percent. The dairy liquid was non-fat milk having 8.5 percent milk solids content by weight and containing 0.25 percent titanium dioxide. The gellan and starch were blended and added to the milk under high shear using a Tekmar Tissuemizer. The resulting liquid was heated to 180° F. for 1 min in an open vessel. It was then dispensed into a receiving vessel and permitted to cool to a temperature of about 115° F. The viscosity at a temperature of 180° F. (hot) and a temperature of 45° F. (cold) was evaluated, and the taste and texture were determined. Results and comments are provided in Table 1.

TABLE 1

Evaluation of starches in dairy gels.

| Starch | Level (%) | Viscosity During Cooking | Characteristics of Cooled Gel |
|---|---|---|---|
| Potato (acid thin boiling) | 8 | Low viscosity | Adds body when tasted |
| Potato (unmodified) | 4–8 | Viscosity too high, Max. concentration 4% | Soft and pudding-like |
| Tapioca (Novation ™ 3300) | 3 | Moderate viscosity | Pink color, lingers too long in the mouth |
| Tapioca (Unmodified) | 3–4 | Viscosity too high at 3 percent | No body when tasted |
| Tapioca (Modified, Purity D ™) | 8 | Viscosity too high | Pudding-like, sticky texture; cannot cut |
| Corn starch (common or dent) | 3–4 | Viscosity too high | Soft gel, cereal flavor too soft at 4% |
| Corn starch (Blend of modified dent and high amylose; Ultraset LT ™) | 4–8 | Viscosity too high, Maximum conc. 4% | Strong cereal off-flavor, too soft at 4% |
| Corn starch (High amylose) (Amalean ™) | 8 | High viscosity, Maximum conc. 4% | Soft, sticky, not cuttable off-flavor |
| Maltodextrins (DE 5) | 8–16 | Insignificant viscosity effect | Insignificant contribution to firmness |
| Maltoddextrins (DE 10 & 20) | 7–8 | Insignificant viscosity effect | Insignificant contribution to firmness |
| Corn Starch (Opta Grade 301) & Modified Potato Starch (Perfecfamyl Gel MB) | 4.5–8 | Viscosity OK | Cuttable, firm, best body & firmness when chewed |
| Tapioca dextrin (N-Oil ™) & Modified Potato Starch (Perfectamyl Gel MB) | 5–8 | Viscosity OK | Cuttabie, firm, best body & firmness when chewed |

The results in Table 1 indicate that acid thin boiled potato starch, alone or in combination with other starches, generally offer the best results among the starch types tested, since they had low viscosities when hot, sufficiently firm final gels, and minimal off-flavors. Based on this finding, several potato starch products were examined in Example 3.

Example 3. Incorporation of Various Potato Starches into Dairy Gels.

Dairy gels of the invention were prepared using 0.8 percent gellan (Kelcogel™, Monsanto Corp.). Various potato starches supplied by AVEBE, were included at concentrations of 1 percent to 10 percent. The dairy liquid was non-fat milk having 8.5 percent milk solids content by weight, and contained 0.25 percent titanium dioxide. The gellan and starch were blended and added to the milk under high shear using a Tekmar Tissuemizer. The resulting liquid was heated to 180° F. for 1 min in an open vessel. It was then dispensed into a receiving vessel and permitted to cool to a temperature of about 115° F. Relative hot viscosity and dairy gel characteristics were determined and are presented in Table 2. The manufacturer, Avebe b. a. International Marketing and Sales, provided the fluidity and Brabender viscosity data.

Based on the results in Table 2, the optimal potato starch to use in the present dairy gels is Perfectamyl Gel MB. Perfectamyl Gel MB produced low hot viscosity, making the dairy gel easier to process. It produced an adequately firm gel upon cooling and contributed a good flavor profile, neither adding substantially to nor detracting from the flavor of the milk.

TABLE 2

Dairy Gels Made with Variou Potato Starches

| Starch | Level (%) | Starch Treatment | Starch Modification | Starch Fluidity[a] | Starch Viscosity[b], BU | Dairy Gel Relative Viscosity[c] | Dairy Gel Characteristics | Dairy Gel Summary[d] |
|---|---|---|---|---|---|---|---|---|
| Perfectamyl B1102 | 8 | Dextrinized | — | DE2 | — | Very low | Brittle, off-flavor | — |
| Perfectamyl Gel | 8 | Oxidized | — | 90 | (30%) 1800[e] | Low | Pasty, slightly starchy, too soft | — |
| Perfectamyl Gel MB | 8 | Acid | Acetylated | 50 | (12%) 400 | — | Low viscosity during cooking; no starchy mouthfeel | ++ |
| Perfectamyl Gel MB Special | 8 | Acid | — | <50 | (12%) 440 | — | Slightly pasty, more sticky to teeth than Perfectamyl Gel MB | + |
| Perfectamyl Gel NF | 8 | Oxidized | — | 60 | (12%) 500–600 | — | Higher viscosity during cooking than Perfectamyl Gel MB, more starchy and pasty | − |
| Perfectamyl HM1499 | 8 | Acid | Not known | — | (12%) 2745 | High | Similar to Perfectamyl Gel MB | + |

TABLE 2-continued

Dairy Gels Made with Variou Potato Starches

| Starch | Level (%) | Starch Treatment | Starch Modification | Starch Fluidity[a] | Starch Viscosity[b], BU | Dairy Gel Relative Viscosity[c] | Dairy Gel Characteristics | Dairy Gel Summary[d] |
|---|---|---|---|---|---|---|---|---|
| Perfectamyl HO 12905B | 8 | Acid | Not known |  | (12%) 7000 | High | Slightly bitter off-taste | + |
| Potato Starch | 4 | — | — | ~1 | (5%) 2900 | Very high | Too viscous during cooking, final gel too soft | − |

[a]Scale of 1–100, 1 = lowest fluidity of starch; 100 = highest fluidity of starch.
[b]Starch viscosity at concentration given, Brabender Units (BU).
[c]Gel viscosity during cooking relative to Perfectamyl Gel MB.
[d]Usefulness: ++ optimal, + acceptable (i.e., able to processs at high enough level to obtain firm, cheese-like texture, − not acceptable (i.e., at maximum processable usage level for starch, final gel was still too soft and did not have cheese-like texture).
[e]Viscosity at (12%) not determined.

We claim:

1. A cheese-like dairy gel comprising about 0.2 to about 2.0 percent of a gum, about 0.5 to about 12 percent of a starch, and about 75 to about 99 percent of a dairy liquid, wherein the gel has the texture, consistency, and mouthfeel of a cheese, wherein the dairy liquid is not renneted or coagulated in order to from the cheese-like dairy gel, and wherein the gum is deacylated gellan gum.

2. The dairy gel described in claim 1, wherein the gel is essentially fat-free.

3. The dairy gel described in claim 1, wherein the cheese is chosen from the group consisting of cottage cheese, ricotta, cream cheese, American cheese, processed cheese, Parmesan cheese, baker's cheese, cheddar, and Feta cheese.

4. The dairy gel described in claim 1, wherein the concentration of the gum is about 0.4 to about 1.5 percent.

5. The dairy gel described in claim 1, wherein the dairy liquid is chosen from the group consisting of whole milk, low fat milk, fat-free milk, a milk concentrate, reconstituted powder milk, cream, and mixture thereof.

6. The dairy gel described in claim 1, wherein the starch in chosen from yhe group consisting of potato starch, tapioca starch, corn starch, rice starch, wheat starch, and mixtures thereof.

7. The dairy gel described in claim 6, wherein the starch is chosen from the group consisting of potato starch, tapioca starch, and mixtures thereof.

8. The dairy gel described in claim 6, wherein the concentration of the starch is about 4 to about 11 percent.

9. The dairy gel described in claim 1, wherein the dairy gel further comprises a divalent cation chosen from the group consisting of calcium, magnesium, and mixtures thereof.

10. The dairy gel described in claim 1, further comprising a sequestrant.

11. The dairy gel described in claim 10, wherein the sequestrant is chosen from the group consisting of disodium phosphate, trisodium phosphate, tetrasodium pyrophosphate, tricalcium citrate, and mixtures thereof.

12. A cheese-like dairy gel consisting essentially of about 0.6 to about 1.0 percent of a deacylated gellan, about 8 to about 10 percent of an acid thinned potato starch, and a dairy liquid having about 8.5 percent milk solids, wherein the milk solids are obtained from a non-fat milk, a low fat milk, or whole milk, wherein the resulting dairy gel has the texture, consistency, and mouthfeel of a cheese.

13. The cheese-like dairy gel described in claim 12, further consisting essentially of additives chosen from the group consisting of titanium dioxide, calcium cation, flavoring, protein, fiber, nutritive sweeteners, non-nutritive sweeteners, vitamins, minerals, beneficial bacteria, and mixtures thereof, wherein none of the additives detrimentally affects the cheese-like texture, consistency, and mouthfeel of the dairy gel.

14. A process for preparing a cheese-like dairy gel comprising the steps of:

(i) combining a gum and a starch to form a dry mixture;

(ii) adding the dry mixture to a dairy liquid to form a liquid dairy slurry;

(iii) heating the liquid dairy slurry to about 160 to about 225° F. for about ¼ minute to about 3 minutes to form a gelable liquid suspension; and (iv) cooling the liquid suspension to ambient temperature or below, thereby forming the cheese-like dairy gel; wherein the cheese-like dairy gel has the texture, consistency, and mouthfeel of a cheese.

15. The method of claim 14 wherein the liquid dairy liquid is homogenized prior to the heating step (iii).

16. The method of claim 14, further comprising the steps of:

(1) first cooling the gelable liquid suspension to an intermediate temperature whereby the first cooled gelable liquid suspension remains pumpable;

(2) dispensing the pumpable first cooled gelable liquid suspension into containers; and (3) further cooling the first cooled gelable liquid suspension in the containers to ambient temperature or below to form the cheese-like dairy gel.

17. The process described in claim 14, wherein the gel is essentially fat-free.

18. The process described in claim 14, wherein the cheese is chosen from the group consisting of cottage cheese, ricotta, cream cheese, American cheese, processed cheese, Parmesan cheese, baker's cheese, cheddar, and Feta cheese.

19. The process described in claim 14, wherein the gum is an ionically neutral gum.

20. The process described in claim 14, wherein the gum is native or deacylated gellan gum.

21. The process described in claim 14, wherein the gum is an anionic gum.

22. The process described in claim 14, wherein the gum is chosen from the group consisting of carrageenan, kappa-carrageenan, native gellan gum, deacylated gellan gum, agar, furcelleran, alginate, konjac, and mixtures thereof.

23. The process described in claim 22, wherein the amount of gum combined in the dry mixture is effective to bring its concentration in the dairy gel to about 0.2 to about 2.0 percent.

24. The process described in claim 23, wherein the amount of the gum is about 0.4 to about 1.5 percent.

25. The process described in claim 14, wherein the dairy liquid is chosen from the group consisting of whole milk, low fat milk, fat-free milk, a milk concentrate, reconstituted powdered milk, cream, and mixtures thereof.

26. The process described in claim 14, wherein the starch is chosen from the group consisting of potato starch, tapioca starch, corn starch, rice starch, wheat starch, and mixtures thereof.

27. The process described in claim 26, wherein the starch is chosen from the group consisting of potato starch, tapioca starch, and mixtures thereof.

28. The process described in claim 27, wherein the amount of starch combined in the dry mixture is effective to bring its concentration in the dairy gel to about 0.5 to about 12 percent.

29. The process described in claim 28, wherein the concentration of the starch is about 4 to about 11 percent.

30. The process described in claim 14, wherein the dairy liquid employed in step (ii) further comprises a divalent cation chosen from the group consisting of calcium, magnesium, and a mixture thereof.

31. The process described in claim 14, wherein the dairy liquid employed in step (ii) further comprises a sequestrant.

32. The process described in claim 31, wherein the sequestrant is chosen from the group consisting of disodium phosphate, trisodium phosphate, tetrasodium pyrophosphate, tricalcium citrate, and mixtures thereof.

33. The process described in claim 14, further wherein additives chosen from the group consisting of titanium dioxide, flavoring, protein, fiber, nutritive sweeteners, non-nutritive sweeteners, vitamins, minerals and mixtures thereof are included in either the dry mixture employed in step (i) or the dairy liquid employed in step (ii), or in both the dry mixture and the dairy liquid.

34. The process described in claim 14, further comprising adding beneficial bacteria to the dairy gel of step (v) at a temperature at which the bacteria remain viable, and blending the bacteria into the gel.

35. The process described in claim 14, wherein the gum employed in step (i) is a deacylated gellan added in an amount effective to bring its concentration in the dairy gel to about 0.6 to about 1.0 percent, the starch employed in step (i) is an acid thinned potato starch added in an amount effective to bring its concentration in the dairy gel to about 8 percent to about 10 percent, and the dairy liquid employed in step (ii) contains about 8.5 percent milk solids, wherein the milk solids are obtained from a non-fat milk, a low fat milk, or whole milk.

* * * * *